United States Patent
Chen et al.

(10) Patent No.: US 11,442,893 B2
(45) Date of Patent: Sep. 13, 2022

(54) DATABASE-AWARE SNAPSHOTTING

(71) Applicant: Red Hat, Inc., Raleigh, NC (US)

(72) Inventors: Huamin Chen, Westford, MA (US); Tomas Smetana, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 534 days.

(21) Appl. No.: 16/115,746

(22) Filed: Aug. 29, 2018

(65) Prior Publication Data

US 2020/0073956 A1 Mar. 5, 2020

(51) Int. Cl.
*G06F 16/11* (2019.01)
*G06F 16/27* (2019.01)

(52) U.S. Cl.
CPC .......... *G06F 16/128* (2019.01); *G06F 16/278* (2019.01); *G06F 2201/84* (2013.01)

(58) Field of Classification Search
None
See application file for complete search history.

(56) References Cited

U.S. PATENT DOCUMENTS

| | | | |
|---|---|---|---|
| 8,516,210 B2 | 8/2013 | Buragohain et al. | |
| 9,336,250 B1 * | 5/2016 | Shaikh | G06F 11/3055 |
| 9,590,872 B1 * | 3/2017 | Jagtap | H04L 41/145 |
| 9,823,973 B1 | 11/2017 | Natanzon | |
| 9,940,377 B1 * | 4/2018 | Sait | H04L 67/1097 |
| 10,528,367 B1 * | 1/2020 | Liu | G06F 9/4498 |
| 2010/0106867 A1 * | 4/2010 | Ghorakavi | G06F 13/102 710/33 |
| 2016/0306709 A1 | 10/2016 | Shaull | |
| 2018/0075130 A1 * | 3/2018 | Rodgers | G06F 16/285 |
| 2019/0065323 A1 * | 2/2019 | Dhamdhere | G06F 9/455 |
| 2019/0273746 A1 * | 9/2019 | Coffing | H04L 63/20 |
| 2019/0332692 A1 * | 10/2019 | Rachapudi | G06F 11/1471 |
| 2019/0394219 A1 * | 12/2019 | Huang | H04L 63/1425 |
| 2019/0394302 A1 * | 12/2019 | Kristiansson | H04L 67/34 |
| 2020/0034245 A1 * | 1/2020 | Kohler | G06F 11/1458 |

FOREIGN PATENT DOCUMENTS

WO    2017190758 A1    11/2017

OTHER PUBLICATIONS

Author Unknown, "Snapshot copies that span storage systems or volumes," Part No. 215-06643_AD, Feb. 2014, NetApp, Inc., 2 pages.

(Continued)

*Primary Examiner* — Yu Zhao
(74) *Attorney, Agent, or Firm* — Dority & Manning, P.A.

(57) ABSTRACT

Database-aware snapshotting is disclosed. It is determined that a first snapshot of a database having a plurality of shards should be taken. Each shard has a corresponding snapshot sidecar container of a plurality of snapshot sidecar containers. A consensus state among the plurality of snapshot sidecar containers that the first snapshot should be taken is determined. A snapshot controller is directed to take the first snapshot of the database, the first snapshot generating a shard volume snapshot for each shard of a plurality of shards. Subsequent to the snapshot controller taking the first snapshot of the database, each snapshot sidecar container is informed to allow activity on the corresponding shard.

20 Claims, 12 Drawing Sheets

(56) References Cited

OTHER PUBLICATIONS

Wang, Cindy, "Kubernetes Snapshotting Proposal," github.com/kubernetes/community/blob/master/contributors/design-proposals/storage/volume-snapshotting.md, last modified on Dec. 22, 2017, 10 pages.
Author Unknown, "Creating Persistent Disk Snapshot," Compute Engine Documentation, https://cloud.google.com/compute/docs/disks/create-snapshots, last updated May 23, 2018, 10 pages.
Author Unknown, "Introduction to Consistent Backup," Chapter 5, n2ws.com/support/documentation/5-introduction-consistent-backup, publication date of Jun. 1, 2018 or earlier, N2W Software, Inc., 6 pages.
Liston, Bryan, "Automating the Creation of Consistent Amazon EBS Snapshots with Amazon EC2 Systems Manager," Part 2, AWS Compute Blog, Mar. 9, 2017, accessible at https://aws.amazon.com/blogs/compute/automating-the-creation-of-consistent-amazon-ebs-snapshots-with-amazon-ec2-systems-manager-part-2/, 6 pages.

\* cited by examiner

DATABASE-AWARE SNAPSHOTTING

TECHNICAL FIELD

The examples relate generally to backing up storage, and in particular to implementing database-aware snapshotting.

BACKGROUND

Certain types of data processing environments utilize volume snapshots as a primary storage backup mechanism. Such data processing environments may also use relatively sophisticated data storage mechanisms, such as database software. The volume snapshot mechanism generally works independently of database software.

SUMMARY

The examples implement database-aware snapshotting.

In one example a method is provided. The method includes determining that a first snapshot of a database having a plurality of shards should be taken, each shard having a corresponding snapshot sidecar container of a plurality of snapshot sidecar containers. The method further includes determining a consensus state among the plurality of snapshot sidecar containers that the first snapshot should be taken. The method further includes directing a snapshot controller to take the first snapshot of the database, the first snapshot generating a shard volume snapshot for each shard of the plurality of shards. The method further includes, subsequent to the snapshot controller taking the first snapshot of the database, informing each snapshot sidecar container to allow activity on the corresponding shard.

In another example a system is provided. The system includes one or more memories, and one or more processor devices coupled to the one or memories. The one or more processor devices are to determine that a first snapshot of a database having a plurality of shards should be taken, each shard having a corresponding snapshot sidecar container of a plurality of snapshot sidecar containers. The one or more processor devices are further to determine a consensus state among the plurality of snapshot sidecar containers that the first snapshot should be taken. The one or more processor devices are further to direct a snapshot controller to take the first snapshot of the database, the first snapshot generating a shard volume snapshot for each shard of the plurality of shards. The one or more processor devices are further to, subsequent to the snapshot controller taking the first snapshot of the database, inform each snapshot sidecar container to allow activity on the corresponding shard.

In another example a computer program product is provided. The computer program product is stored on a non-transitory computer-readable storage medium and includes instructions to cause one or more processor devices to determine that a first snapshot of a database having a plurality of shards should be taken, each shard having a corresponding snapshot sidecar container of a plurality of snapshot sidecar containers. The instructions further cause the one or more processor devices to determine a consensus state among the plurality of snapshot sidecar containers that the first snapshot should be taken. The instructions further cause the one or more processor devices to direct a snapshot controller to take the first snapshot of the database, the first snapshot generating a shard volume snapshot for each shard of the plurality of shards. The instructions further cause the one or more processor devices to, subsequent to the snapshot controller taking the first snapshot of the database, inform each snapshot sidecar container to allow activity on the corresponding shard.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
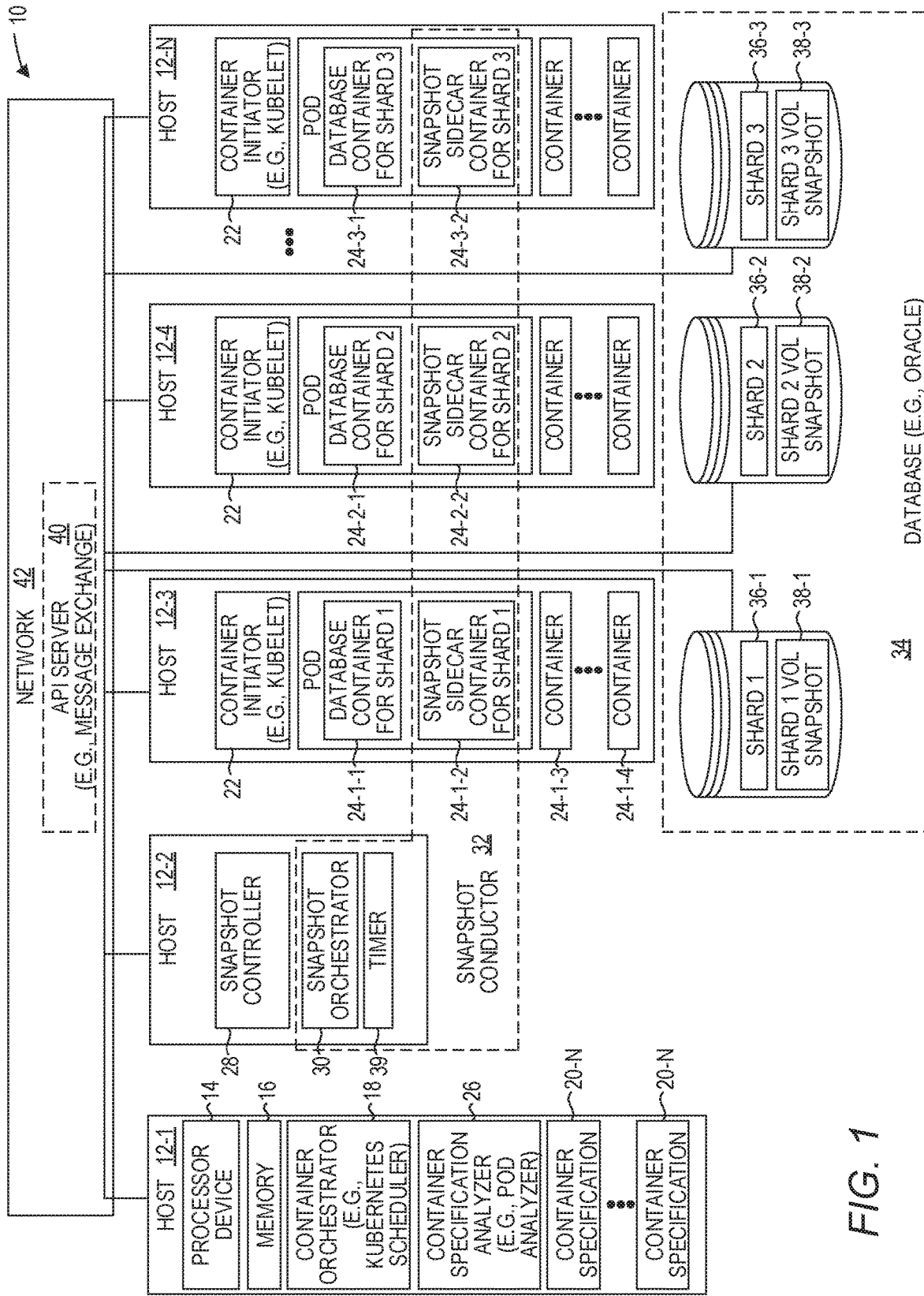
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Certain types of data processing environments utilize volume snapshots as a primary storage backup mechanism.

Such data processing environments may also use relatively sophisticated data storage mechanisms, such as database software. The volume snapshot mechanism generally works independently of database software. This can result in a number of less than desirable situations. For example, a volume snapshot may be initiated at a point in time when the database is being heavily used. The database is temporarily frozen while the snapshot is taken, which delays pending transactions, leading to user dissatisfaction. Often for throughput and scalability purposes a database is divided up into a plurality of different shards, with each shard being maintained on a separate volume. The greater the number of shards, the larger the likelihood that one or more of the shards will be under heavy utilization at the time of a snapshot, increasing a likelihood of transaction delay and user dissatisfaction.

The examples implement database-aware snapshotting. In some examples, a container specification analyzer analyzes a container specification that is to be subsequently initiated. The container specification analyzer detects that a database container is scheduled to be initiated in the container specification, and in response to detecting that the database container is identified in the container specification, the container specification analyzer modifies the container specification to initiate a snapshot sidecar container. The snapshot sidecar container and a snapshot orchestrator make up a snapshot conductor that operate together to initiate snapshots of the database in a manner that takes into consideration a current runtime environment of the database. In some examples, multiple database containers may be initiated, one database container for each shard of a database. The container specification analyzer injects, for each database container, a corresponding snapshot sidecar container, and the snapshot sidecar containers together with the snapshot orchestrator operate together to take a concurrent snapshot of each shard of the database in a manner that takes into account the current runtime environments of each database shard. The examples thus facilitate an improvement to computer functionality itself by ensuring that database snapshots are taken at times that minimize transaction delay.

FIG. 1 is a block diagram of an environment 10 in which examples may be practiced. The environment 10 is a cloud computing environment in which a plurality of hosts 12-1-12-N (generally, hosts 12) is used to implement a plurality of different containers, on demand. The hosts 12 may comprise, for example, physical computing devices or virtual machines implemented in a physical computing device. The term "container" as used herein refers to a stand-alone, executable package of a piece of software that includes all resources to run the software, including code, runtime, system libraries, and settings, and that are implemented via a containerization technology, such as, by way of non-limiting example, Docker containerization technology or Linux LXC containerization technology, or the like. The environment 10 may be any cloud computing environment, such as a third-party Amazon® Amazon Web Services (AWS) cloud computing environment or Microsoft® Azure cloud computing environment, or a private enterprise cloud computing environment.

Each of the hosts 12 includes a processor device 14 and a memory 16, although the processor device 14 and memory 16 are not illustrated for the hosts 12-2-12-N for purposes of simplification. The environment 10 utilizes a container orchestrator 18 that manages, or orchestrates, the initiation of containers in the environment 10. While the examples have applicability with any container orchestration system, in some examples the container orchestrator is the Kubernetes scheduler container orchestration system. The term "container orchestration" as used herein refers to systems and technologies that manage the runtime initiation of containers in response to various inputs and/or criteria, and may comprise, by way of non-limiting example, the Kubernetes container orchestration technology, Apache Meso container orchestration technology, Docker Swarm container orchestration technology, Openshift container orchestration technology, or the like.

The container orchestrator 18 iteratively obtains, receives, or otherwise accesses a plurality of container specifications 20-1-20-N (generally, container specifications 20). The container orchestrator 18 then provides each container specification 20 to one of the hosts 12-3-12-N for execution based on any desired distribution mechanism. Generally, a container specification 20 identifies one or more containers that are to be initiated, and may include multiple other parameters and/or attributes that define the runtime environment of such containers, such as volumes to be mounted and used by the containers, a location of the container package, and the like.

As an example of typical processing of a container specification 20, assume that the container orchestrator 18 sends the container specification 20-1 to the host 12-3 for processing. Note that this could be based on a decision made by the container orchestrator 18, or in response to some input from the host 12-3, such as an indication from the host 12-3 that the host 12-3 has the capability to process the container specification 20-1 and initiate the containers identified therein.

A container initiator 22 executes on the host 12-3. The container initiator 22 receives the container specification 20-1, interprets the container specification 20-1, and initiates, for example, one or more containers 24-1-1-24-1-N (generally, containers 24) identified in the container specification 20-1. While the container specifications 20 can comprise any suitable syntax or format that identifies containers to be initiated along with runtime parameters, in some examples the container specifications 20 comprise a Kubernetes Pod specification and follow the Kubernetes Pod specification syntax identified at kubernetes.io. Note that the hosts 12-4 and 12-N process a container specification 20 in a substantially similar manner as that described above with regard to the host 12-3.

To facilitate database-aware snapshotting in the environment 10, in one example, a container specification analyzer 26 receives a container specification 20, such as the container specification 20-1, from the container orchestrator 18 prior to being distributed by the container orchestrator 18 to the host 12-3. Where the container specification analyzer 26 is a separate component from the container orchestrator 18, as illustrated in FIG. 1, the communication of the container specification 20-1 from the container orchestrator 18 to the container specification analyzer 26 may be implemented via any inter-process communication mechanism, such as a socket, an application programming interface (API), or the like. In some examples, the container orchestrator 18 may allow components, such as the container specification analyzer 26, to register with the container orchestrator 18 to receive a container specification 20 and implement processing on the container specification 20, including the modification of the container specification 20, prior to being distributed by the container orchestrator 18 to a host 12. In other examples, the functionality described herein with regard to the container specification analyzer 26 may be integrated into the container orchestrator 18.

The container specification analyzer 26 analyzes the container specification 20, and changes the container specification 20 to generate an updated container specification that includes a command to run a snapshot side car container 24-1-2. In particular, the container specification analyzer 26 analyzes the container specification 20-1 to determine whether one or more predetermined keywords exist in the container specification 20-1 that correspond to a command in the container specification 20-1 to initiate a database container 24-1-1 that is configured to provide database services to other containers 24. If the container specification analyzer 26 determines that the container specification 20-1 includes a command to initiate a database container, the container specification analyzer 26 changes the container specification 20-1 to generate an updated container specification 20-1 that includes a command to initiate the snapshot sidecar container 24-1-2. The container specification analyzer 26 then returns the updated container specification 20-1 to the container orchestrator 18 for subsequent distribution to a host 12-3-12-N.

A host 12-2 in the environment 10 contains a snapshot controller 28 that is configured to initiate snapshots of volumes in the environment 10. The term snapshot refers to a copy of a state of a volume at a particular point in time. A snapshot, for example, can be used to subsequently restore the environment 10 to a previous point in time. The host 12-2 also includes a snapshot orchestrator 30, which, as will be discussed in greater detail below, operates in conjunction with snapshot sidecar containers 24-1-2, 24-2-2 and 24-3-2 to form a snapshot conductor 32. The snapshot conductor 32 facilitates database-aware snapshotting, as will be discussed in greater detail herein.

In the example illustrated in FIG. 1, the environment 10 includes a database 34 made up of a plurality of shards 36-1-36-3. Each shard 36-1, 36-2, 36-3 is managed by a corresponding database container 24-1-1, 24-2-1, 24-3-1. A "shard" is a partition of data in a database, and each shard 36-1-36-3 is maintained as a separate storage device data structure from the other shards 36-1-36-3. The database containers 24-1-1, 24-2-1, 24-3-1 facilitate access to the corresponding shards 36-1, 36-2, 36-3 by other containers 24. For example, the database container 24-3-1 accesses the shard 36-1 via the database container 24-1-1, and accesses the shard 36-2 via the database container 24-2-1.

In this example, the snapshot conductor 32 comprises the snapshot orchestrator 30 and the snapshot sidecar containers 24-1-2, 24-2-2 and 24-3-2. In general, and at a high-level, the snapshot conductor 32 determines at a particular point in time to take a snapshot of the database 34. The determination of a particular point in time may be based on one or more criteria, including, by way of non-limiting example, a timer 39. The snapshot conductor 32 determines that the database containers 24-1-1, 24-2-1, 24-3-1 are at a relatively low utilization state, for example, and freezes activity to the shards 36-1-36-3. The snapshot conductor 32 then directs the snapshot controller 28 to take snapshots of the shards 36-1-36-3. The snapshot controller 28 generates shard snapshots 38-1-38-3. The snapshot conductor 32 then unfreezes the shards 36-1-36-3 so that database activity can continue.

As will be discussed in greater detail herein, the examples involve communications between many of the components discussed above, including, by way of non-limiting example, the container orchestrator 18, the container specification analyzer 26, the snapshot controller 28, the snapshot orchestrator 30, the snapshot sidecar containers 24-1-2, 24-2-2 and 24-3-2, and the container initiator 22. Such communications can be facilitated via any suitable inter-process communication exchange technology. In a Kubernetes example, the components may pass messages to one another via an API server 40 that allows message exchange over a network 42. The API server 40 allows broadcast message exchange, such that messages initiated via the API server 40 may be able to be received by each of the components discussed above. However, the examples are not limited to any particular message exchange mechanism.

Figure 2:
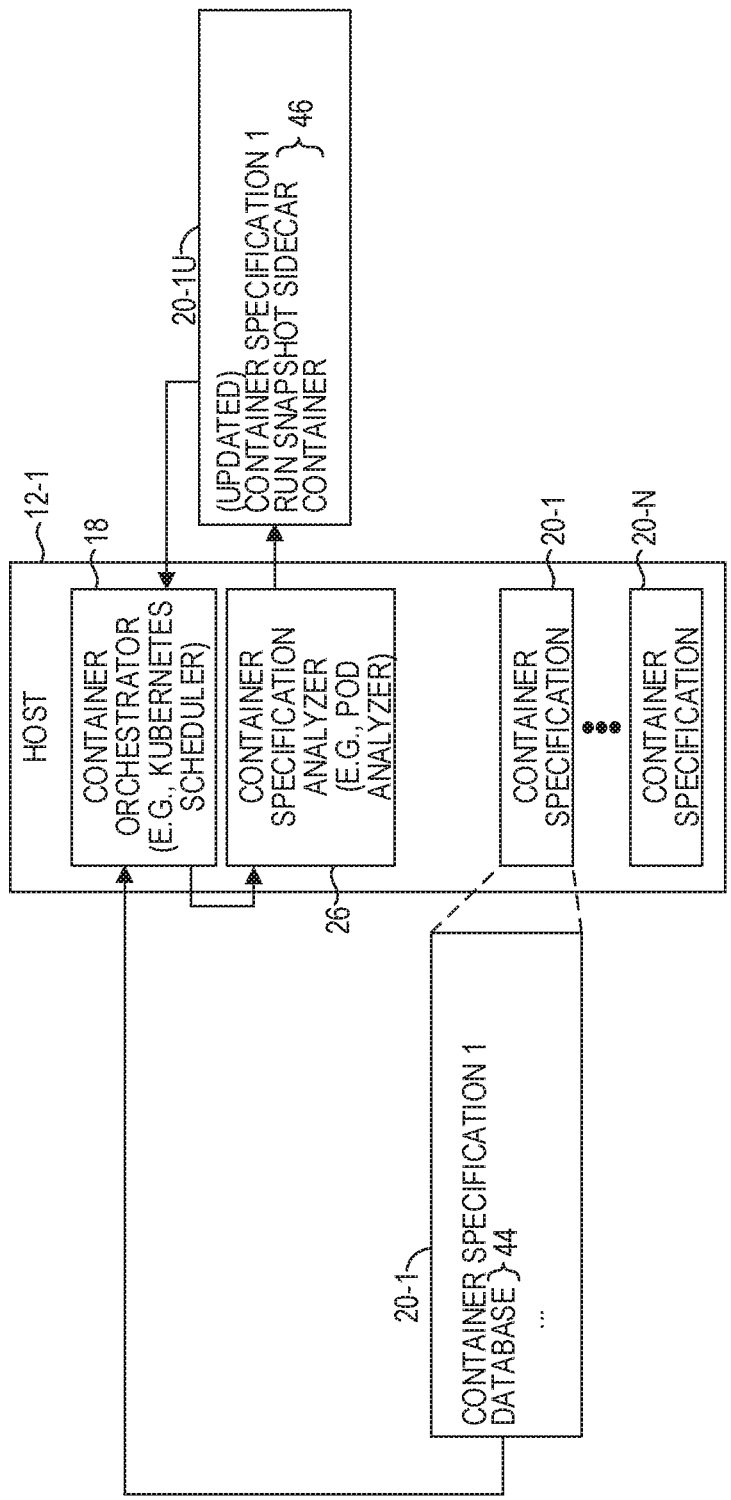
FIG. 2 is a block diagram illustrating the generation of an updated container specification to inject a command to initiate a snapshot sidecar container according to one example.

FIG. 2 is a block diagram illustrating the generation of an updated container specification to inject a command to initiate a snapshot sidecar container 24 according to one example. The container orchestrator 18 begins processing the container specification 20-1 and provides the container specification 20-1 to the container specification analyzer 26. The container specification analyzer 26 analyzes the container specification 20-1 and determines that the container specification 20-1 contains a keyword 44 that indicates that the container specification 20-1 contains instructions to initiate a database container 24. The container specification analyzer 26 changes the container specification 20-1 to generate a container specification 20-1U that includes a new command 46 that causes the initiation of a snapshot sidecar container 24. The container specification analyzer 26 returns the container specification 20-1U to the container orchestrator 18 in lieu of the container specification 20-1. The container orchestrator 18 then distributes the container specification 20-1U to a host 12 for processing.

Figure 3A:
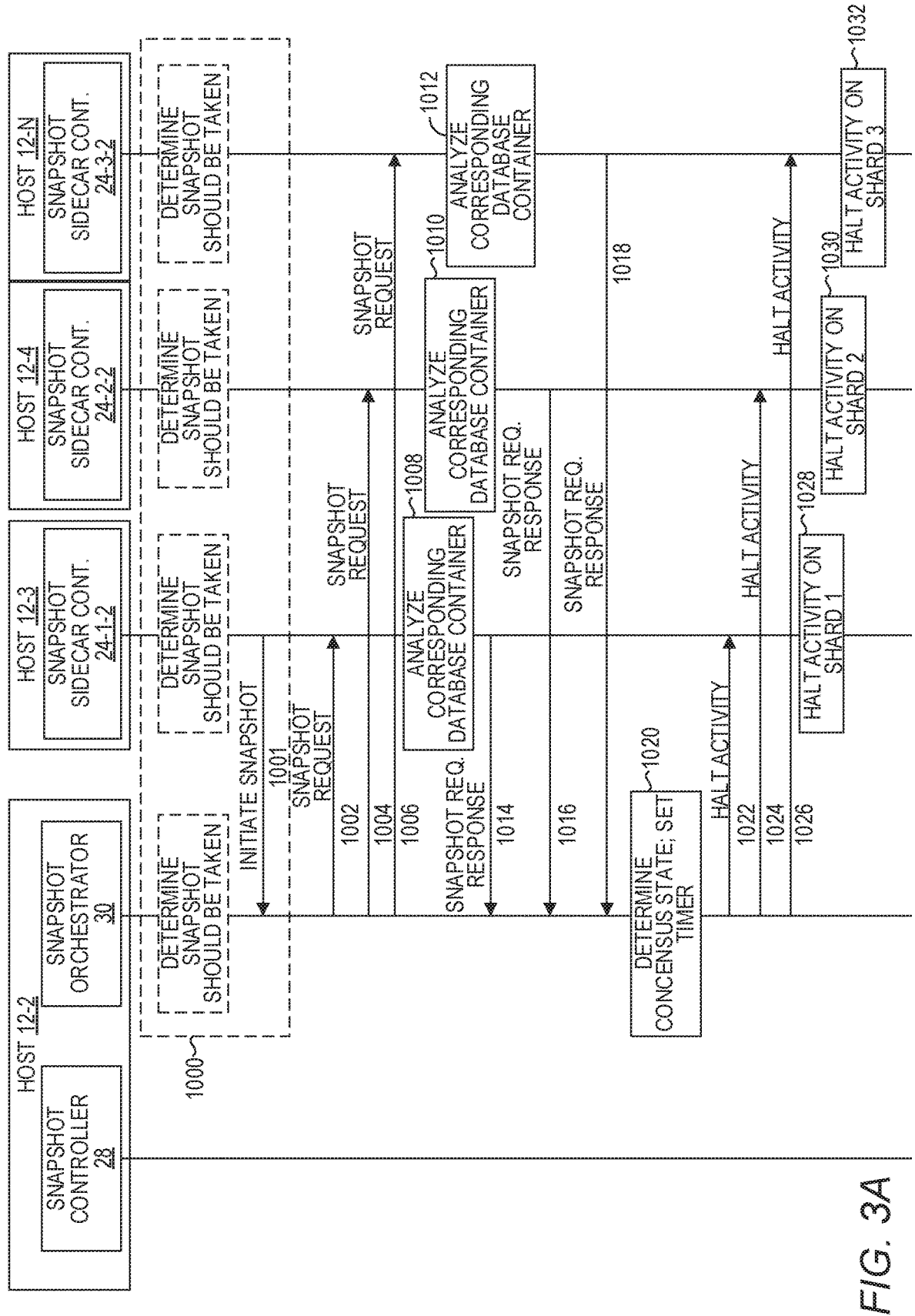
FIGS. 3A-3B are message flow diagrams that illustrate example processing and messages suitable for implementing database-aware snapshotting according to one example.
Figure 3B:
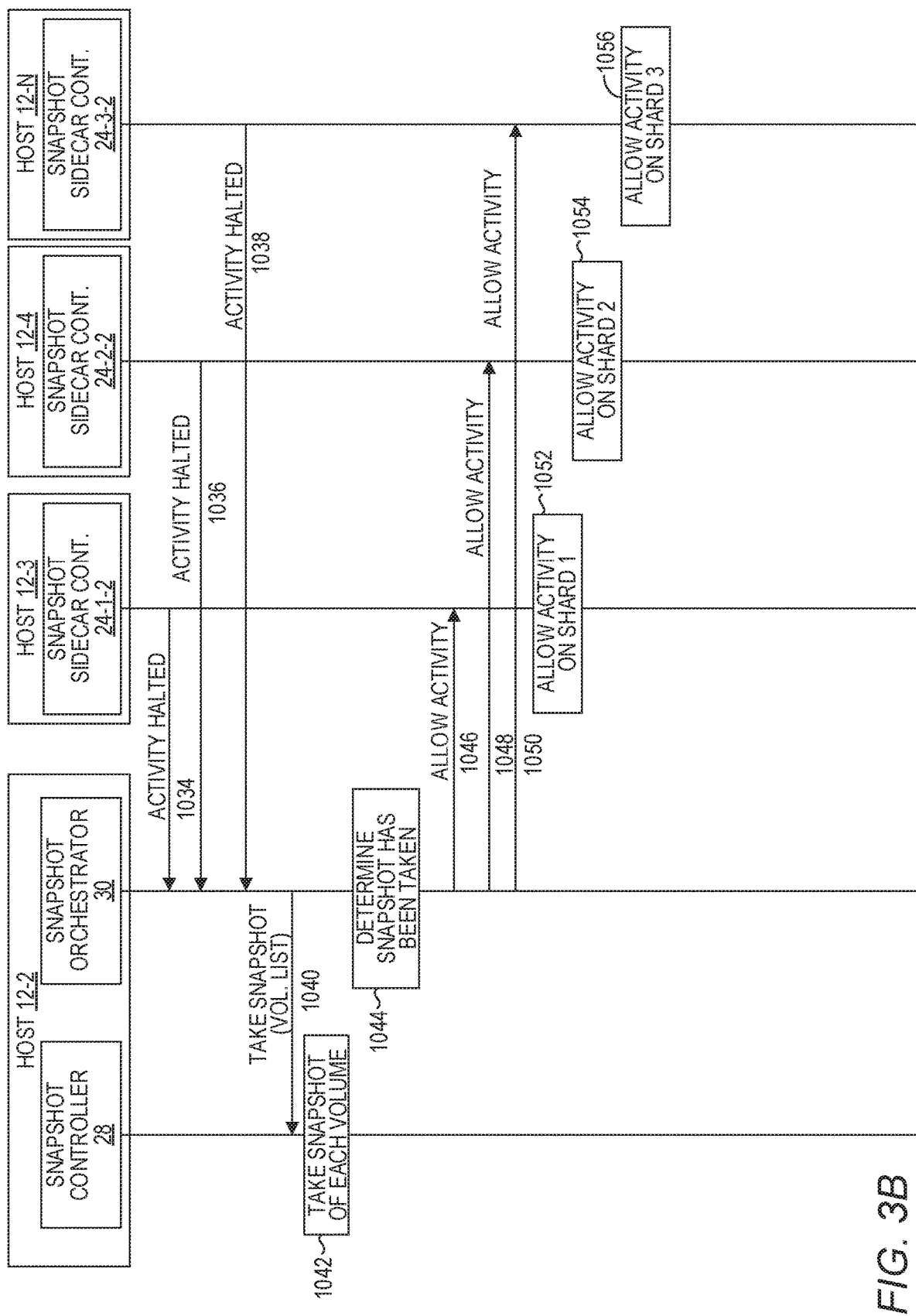

FIGS. 3A-3B are message flow diagrams that illustrate example processing and messages suitable for implementing database-aware snapshotting according to one example. FIGS. 3A-3B will be discussed in conjunction with FIG. 1. Throughout the following figures, the snapshot sidecar containers 24-1-2, 24-2-2 and 24-3-2 will be referred to generally as the snapshot sidecar containers 24, and the database containers 24-1-1, 24-2-1 and 24-3-1 will be referred to generally as the database containers 24 for the sake of brevity. Initially, it is determined that a snapshot of the database 34 should be taken (block 1000). This determination may be made in any number of different ways. In some examples, the snapshot orchestrator 30 determines that a snapshot of the database 34 should be taken. The snapshot orchestrator 30 may make this determination using any desired criteria, including, by way of non-limiting example, the expiration of the timer 39, in response to a request from a snapshot sidecar container 24, in response to a request from the operator, or the like. In other examples, one of the snapshot sidecar containers 24 makes the determination, and after making the determination, sends an initiate snapshot request to the snapshot orchestrator 30 (block 1001). A snapshot sidecar container 24 may make the determination based on any suitable criteria, including, for example, the expiration of a timer, a predetermined number of transactions made to the corresponding shard 36, a particular utilization metric of the corresponding database container 24 such as a memory or processor utilization metric, or the like.

After the determination is made, the snapshot orchestrator 30 sends a snapshot request to each of the snapshot sidecar containers 24 (blocks 1002, 1004, 1006). The snapshot sidecar containers 24 each analyze the corresponding database containers 24 (blocks 1008, 1010, 1012). For example, the snapshot sidecar container 24-1-2 may look at a current transaction rate of the database container 24-1-1, may look at a current processor utilization rate of the database container 24-1-1, may look at a current memory utilization rate of the database container 24-1-1, or may look at any other metrics or criteria associated with the database container 24-1-1. Based on predetermined thresholds, which in some examples may be user configurable, the snapshot sidecar container 24-1-2 makes a determination as to whether or not the current time is a good time for a snapshot of the shard 36-1, and sends a snapshot request response with the results of the determination to the snapshot orchestrator 30 (block 1014).

The snapshot sidecar container 24-2-2 makes a similar determination with regard to the database container 24-2-1, and sends a snapshot request response with the results of the determination to the snapshot orchestrator 30 (block 1016). Similarly, the snapshot sidecar container 24-3-2 makes a similar determination with regard to the database container 24-3-1, and sends a snapshot request response with the results of the determination to the snapshot orchestrator 30 (block 1018). As discussed above, in some examples the communications between any of the components discussed in the present and subsequent drawings may be implemented via a mechanism, such as the API server 40 (FIG. 1), which allows any component to listen to messages sent by any other component. Thus, even though a message may be described herein as being sent from one component to another component, such as from the snapshot sidecar container 24-1-2 to the snapshot orchestrator 30, it is noted that other components, such as the snapshot sidecar containers 24-2-2, 24-3-2 may listen to all message traffic via the API server 40 and thus be aware of message traffic between the snapshot sidecar container 24-1-2 and the snapshot orchestrator 30.

Based on the snapshot request responses received from the snapshot sidecar containers 24, the snapshot orchestrator 30 determines that a consensus state exists (block 1020). The determination of what constitutes the consensus state may be based on any desired criteria and may be system dependent and/or configurable. In some examples the determination may be based on a threshold number of affirmative snapshot request responses. In some examples, the consensus state may be determined if a majority of snapshot request responses indicate that the snapshot should be taken. In other examples, the consensus state may be determined only if all snapshot request responses indicate that the snapshot should be taken.

The snapshot orchestrator 30 may set the timer 29 to a predetermined period of time (block 1020), and then sends a message to each snapshot sidecar container 24 to halt input output (I/O) activity on the corresponding shard 36 (blocks 1022, 1024, 1026). Each of the snapshot sidecar containers 24 then halt activity on the corresponding shards 36 (blocks 1028, 1030, 1032). In particular, the snapshot sidecar container 24-1-2 halts I/O activity on the shard 36-1, the snapshot sidecar container 24-2-2 halts I/O activity on the shard 36-2, and the snapshot sidecar container 24-3-2 halts I/O activity on the shard 36-3. The snapshot sidecar containers 24 may halt activity on the corresponding shards 36 using any desired method, such as via a communication with the corresponding database container 24, or via a system command that freezes activity on the volume of the corresponding shard 36. The snapshot sidecar containers 24 then send activity halted messages to the snapshot orchestrator 30 (blocks 1034, 1036, 1038).

The snapshot orchestrator 30 determines that an activity halted message has been received from each snapshot sidecar container 24 prior to the expiration of the timer 39, and then sends a message to the snapshot controller 28 to take a snapshot of each volume that contains a shard 36 (block 1040). The snapshot controller 28 takes a snapshot of each volume that contains a shard 36, and generates shard volume snapshots 38-1, 38-2, and 38-3 (block 1042). The snapshot orchestrator 30 determines that the snapshot has been taken (block 1044), and sends each snapshot sidecar container 24 a message to allow activity on the corresponding shard 36 (blocks 1046, 1048 and 1050). Each snapshot sidecar container 24 unfreezes I/O activity on the corresponding shard 36 (blocks 1052, 1054, 1056).

In this manner, the snapshot orchestrator 30, the snapshot sidecar containers 24 and the snapshot controller 28 implement database-aware snapshotting in a manner that takes into consideration actual activity on the database 34 to determine whether or not a snapshot should be taken.

Figure 4A:
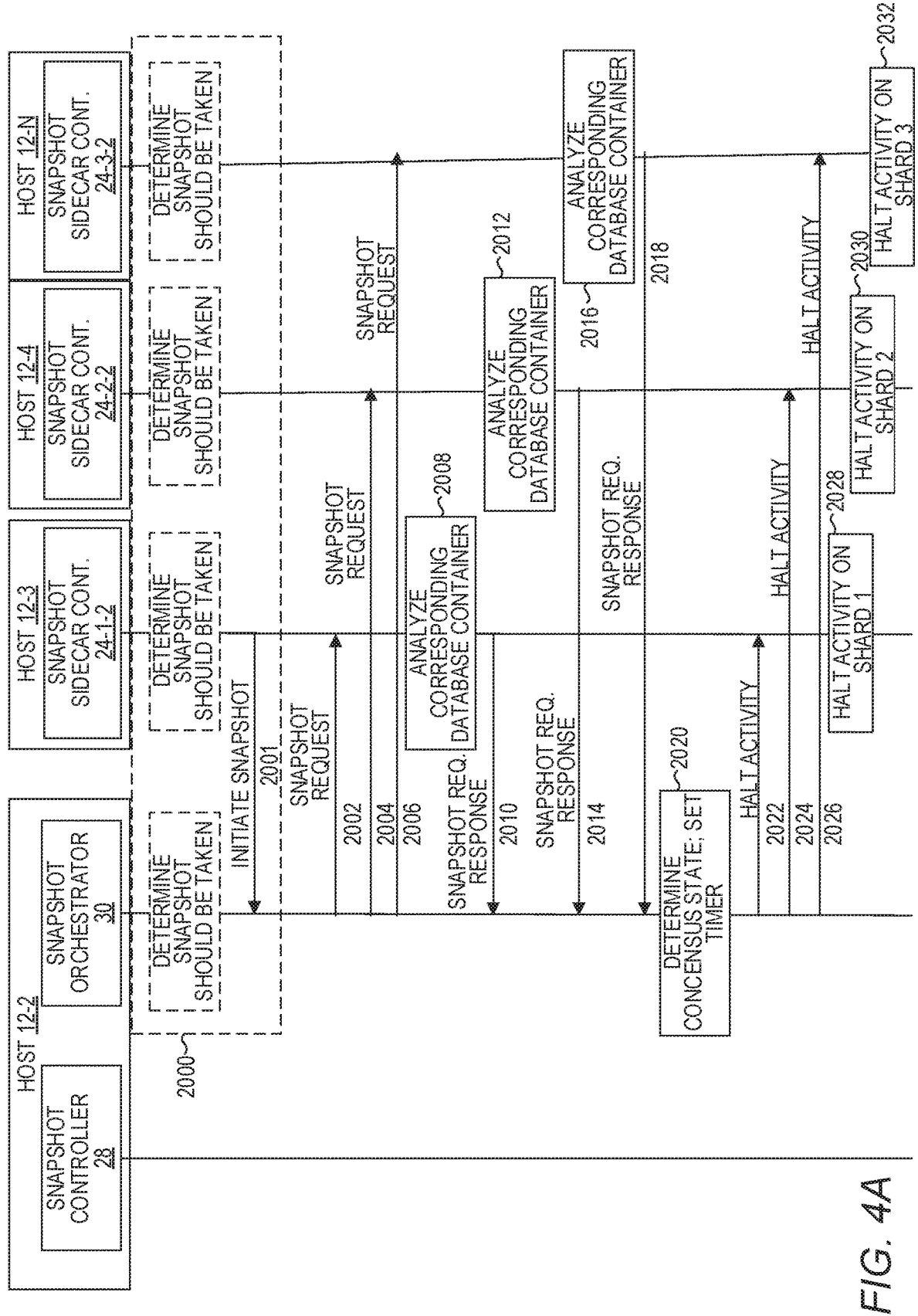
FIGS. 4A-4B are message flow diagrams that illustrate example processing and messages suitable for implementing database-aware snapshotting according to another example.
Figure 4B:
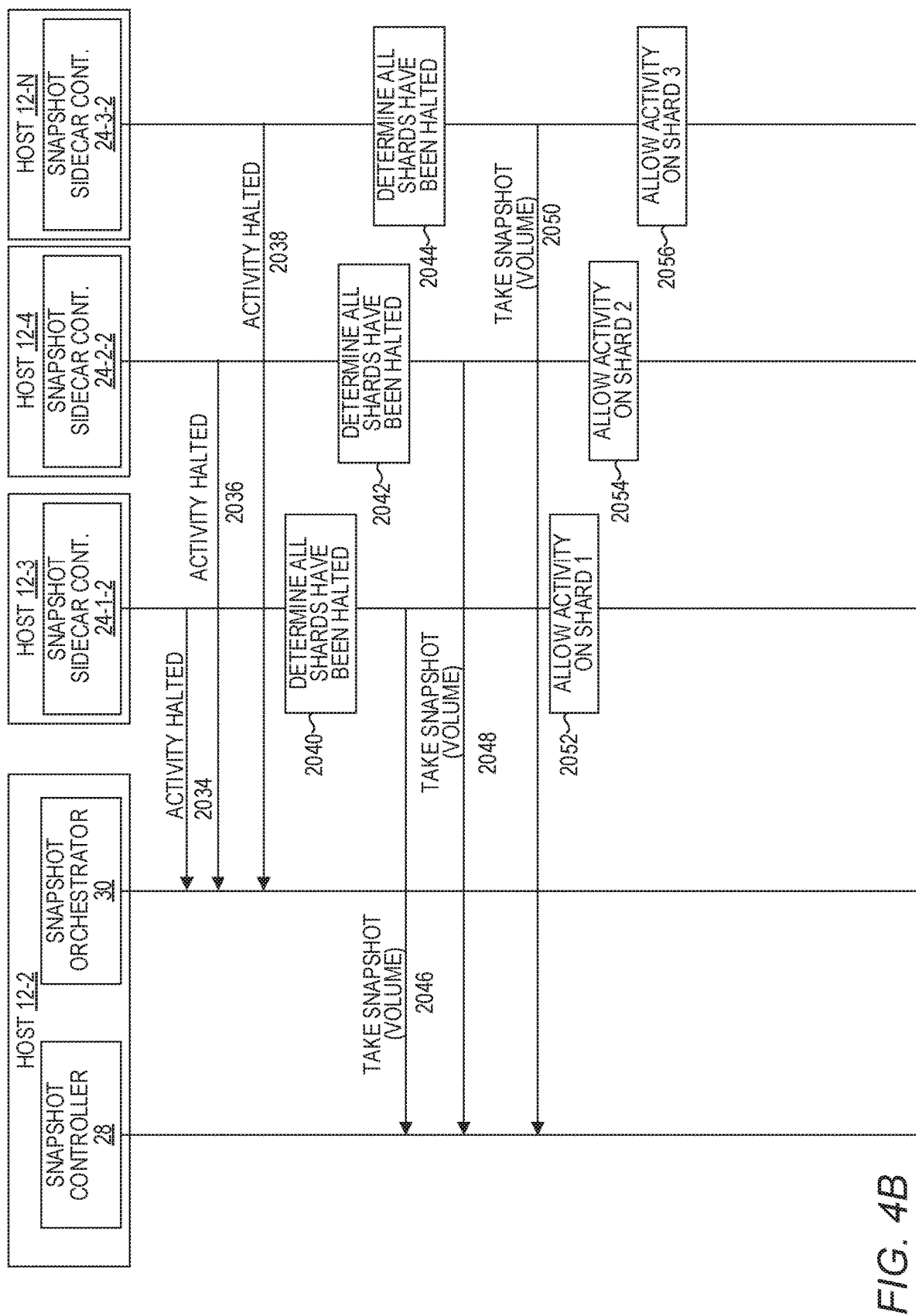

FIGS. 4A-4B are message flow diagrams that illustrate example processing and messages suitable for implementing database-aware snapshotting according to another example. FIGS. 4A-4B will be discussed in conjunction with FIG. 1. In this example, the snapshot sidecar containers 24 rather than the snapshot orchestrator 30 may direct the snapshot controller 28 to take a snapshot of the volume containing the corresponding shard 36. Blocks 2000-2038 are substantially similar, or identical, to the corresponding blocks 1000-1038 discussed above with regard to FIGS. 3A-3B, and for the sake of brevity, will not be described again with respect to FIGS. 4A-4B. However, in this example, each snapshot sidecar container 24 listens to the activity halted messages sent by the other snapshot sidecar containers 24 to the snapshot orchestrator 30. In some examples, each snapshot sidecar container 24 may maintain a counter that is incremented each time the snapshot sidecar container 24 detects an activity halted message. Each snapshot sidecar container 24 ultimately determines that all the snapshot sidecar containers 24 have indicated that I/O activity has been halted on the corresponding shard 36 (blocks, 2040, 2042, 2044). Each snapshot sidecar container 24 then sends a message to the snapshot controller 28 to take a snapshot of the volume that contains the corresponding shard 36 (blocks 2046, 2048, 2050). After each snapshot sidecar container 24 determines that the snapshot has been taken, the snapshot sidecar container 24 unfreezes I/O activity on the corresponding shard 36 (blocks 2052, 2054, 2056).

Figure 5:
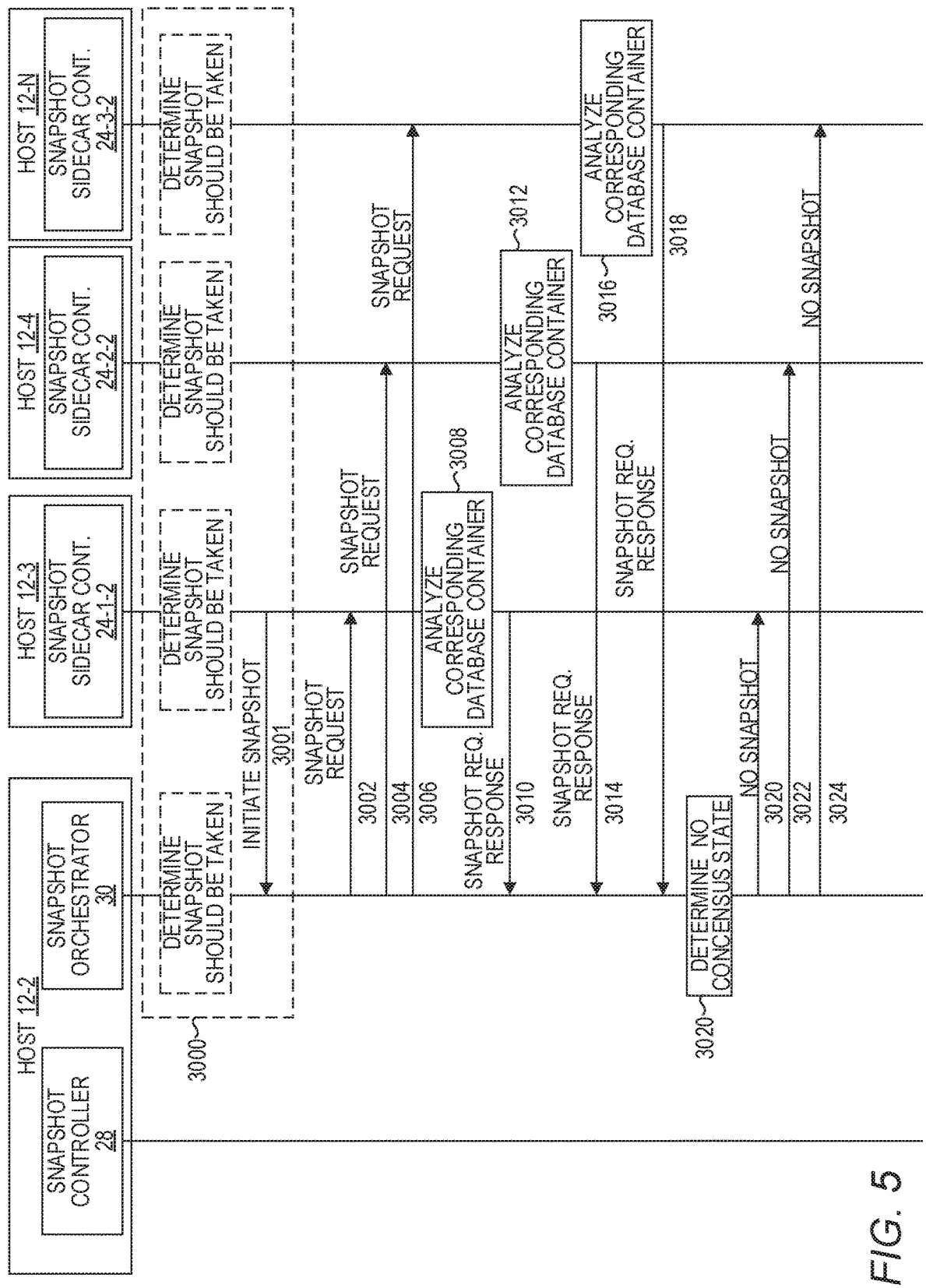
FIG. 5 is a message flow diagram that illustrates example processing and messages suitable for implementing database-aware snapshotting according to another example.

FIG. 5 is a message flow diagram that illustrates example processing and messages suitable for implementing database-aware snapshotting according to another example. FIG. 5 will be discussed in conjunction with FIG. 1. In this example, blocks 3000-3018 are substantially similar, or identical, to the corresponding blocks 1000-1018 discussed above with regard to FIGS. 3A-3B, and for the sake of brevity, will not be described again with respect to FIG. 5. However, in this example the snapshot orchestrator 30 determines, based on the snapshot request responses received from the snapshot sidecar containers 24, that there is not a consensus state. For example, the snapshot orchestrator 30 may require unanimity, and one of the snapshot sidecar containers 24, based on utilization metrics associated with a corresponding database container 24, indicated that the current time is not a good time to take a snapshot. Or, for example, the snapshot orchestrator 30 may require only that a majority of snapshot request responses indicate that a snapshot should be taken, but two of the snapshot sidecar containers 24, based on utilization metrics associated with the corresponding database containers 24, indicated that the current time is not a good time to take a snapshot. In response, the snapshot orchestrator 30 determines that a snapshot should not be taken, and sends the snapshot sidecar containers 24 a message indicating that no snapshot will be taken at the current time (blocks 3020, 3022, 3024).

Figure 6A:
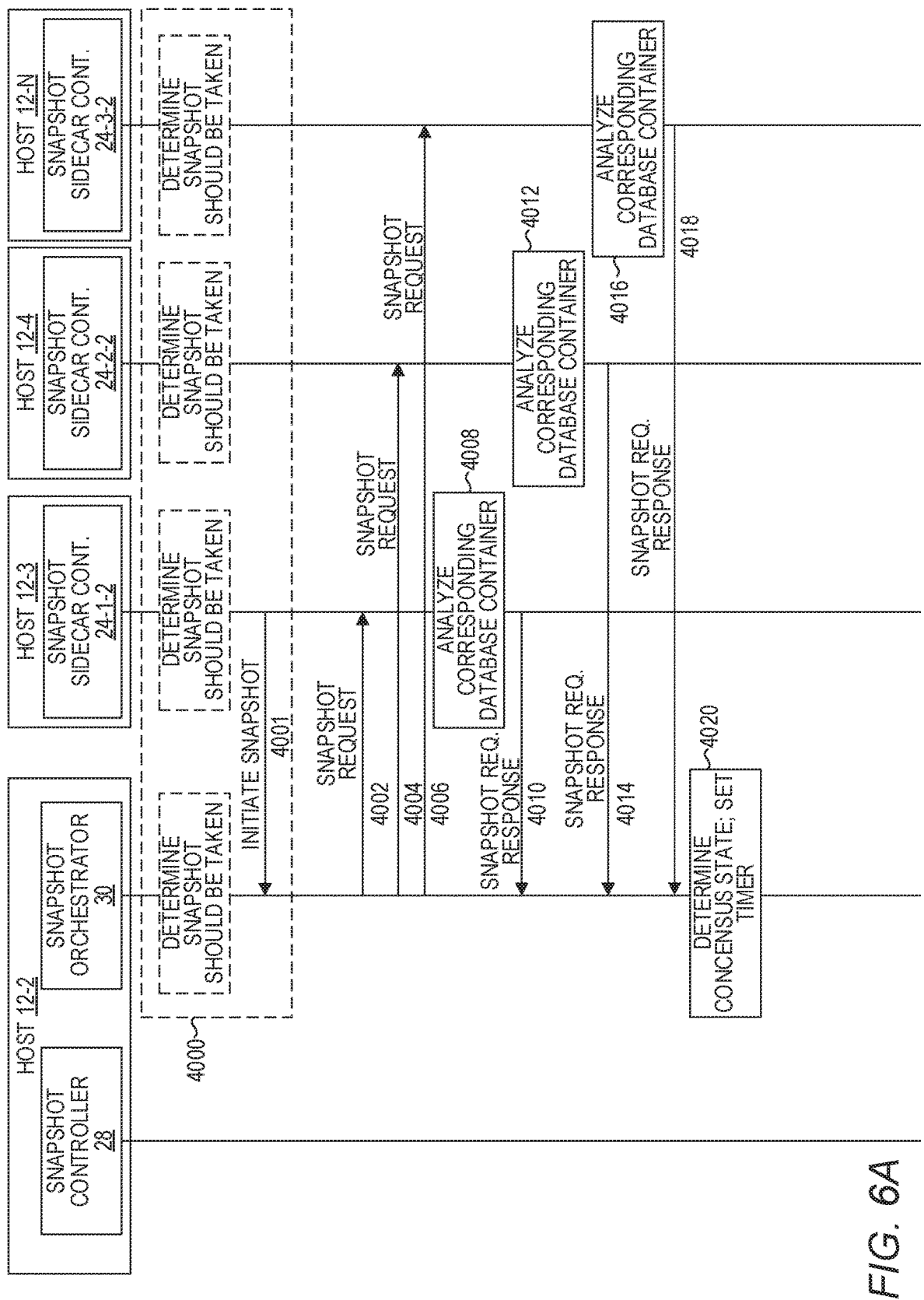
FIGS. 6A-6B are message flow diagrams that illustrate example processing and messages suitable for implementing database-aware snapshotting according to another example.
Figure 6B:
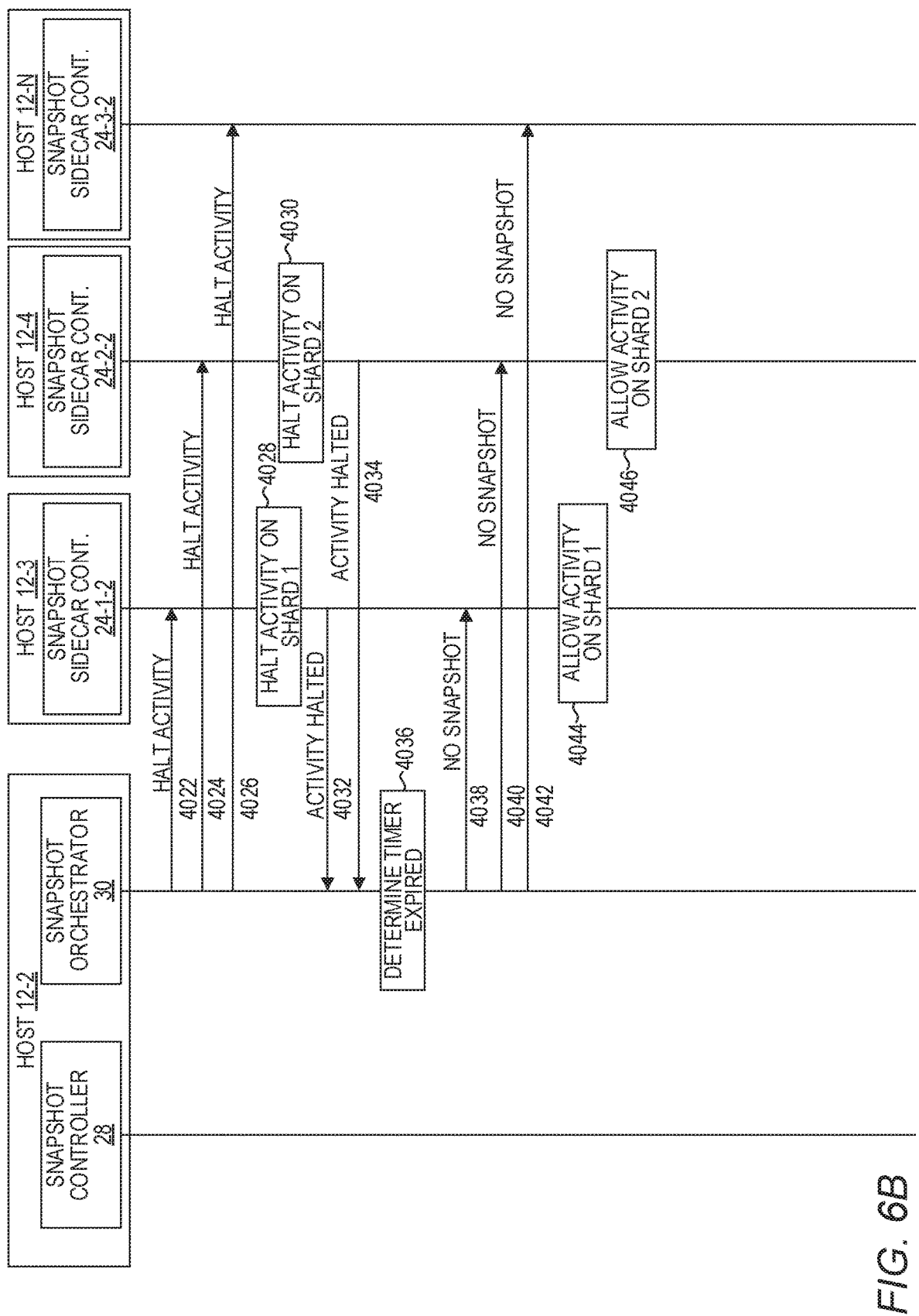

FIGS. 6A-6B are message flow diagrams that illustrate example processing and messages suitable for implementing database-aware snapshotting according to another example. FIGS. 6A-6B will be discussed in conjunction with FIG. 1. In this example, the snapshot orchestrator 30 cancels a snapshot of the database 34 after failing to receive a response from a snapshot sidecar container 24 within a predetermined time period. Blocks 4000-4026 are substantially similar, or identical, to the corresponding blocks 1000-1026 discussed above with regard to FIGS. 3A-3B, and for the sake of brevity, will not be described again with respect to FIGS. 6A-6B. In response to the message from the snapshot orchestrator 30 to halt I/O activity on the corresponding shards 36, the snapshot sidecar containers 24-1-2 and 24-2-2 halt I/O activity on the corresponding shards 36, and send activity halted messages to the snapshot orchestrator 30 (blocks, 4028, 4030, 4032, 4034). However, the timer 39 expires, and the snapshot orchestrator 30 determines that it has not received an activity halted message from at least one of the snapshot sidecar containers 24, in this example the snapshot sidecar container 24-3-2 (block 4036). This may occur for example, because the host 12-N is too busy to respond within the time period set by the timer 39, because the snapshot sidecar container 24-3-2, based on the metrics associated with the database container 24-3-2 now decides it is not a good time to take a snapshot, or for any number of other reasons. Because the snapshot orchestrator 30 determines that it has not received an activity halted message from at least one of the snapshot sidecar containers 24, the snapshot orchestrator 30 determines that a snapshot will not be taken at the current time and sends a no snapshot message to each of the snapshot sidecar containers 24 (blocks 4038, 4040, 4042). The snapshot sidecar containers 24-1-2 and 24-2-2 unfreeze I/O activity on the corresponding shards 36 (blocks 4044, 4046).

Figure 7:
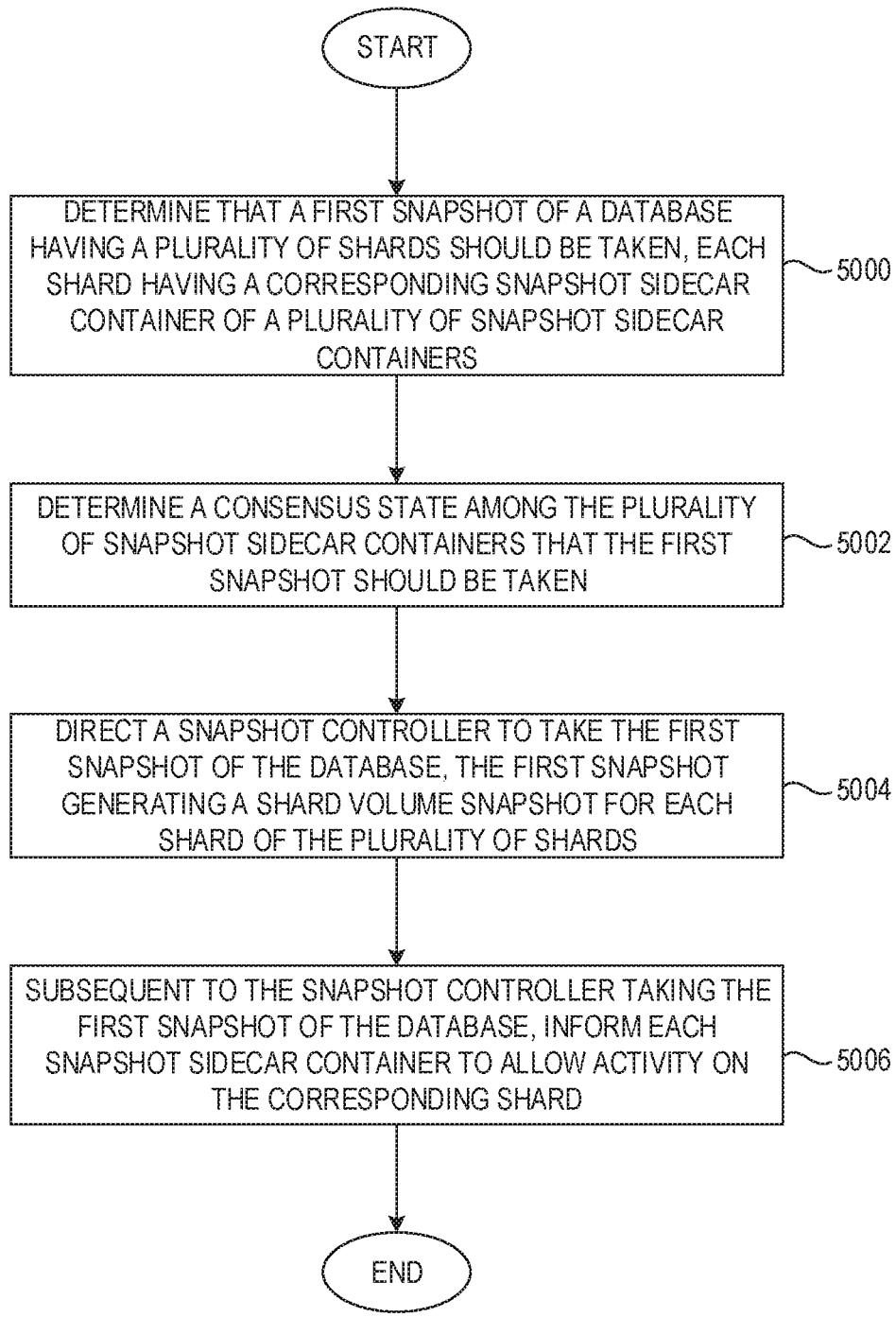
FIG. 7 is a flowchart of a method for database-aware snapshotting according to one example.

FIG. 7 is a flowchart of a method for database-aware snapshotting according to one example. FIG. 7 will be discussed in conjunction with FIG. 1. The snapshot orchestrator 30 of a snapshot sidecar container 24 determines that a first snapshot of the database 34 having the plurality of shards 36 should be taken (block 5000). Each shard 36 has the corresponding snapshot sidecar container 24 of the plurality of snapshot sidecar containers 24. The snapshot orchestrator 30 determines that a consensus state among the plurality of snapshot sidecar containers 24 that the snapshot should be taken exists (block 5002). The snapshot orchestrator 30, or the snapshot sidecar containers 24, direct the snapshot controller 28 to take the snapshot of the database 34 (block 5004). The snapshot generates a shard volume snapshot 38 for each shard 36 of the plurality of shards 36. Subsequent to the snapshot controller 28 taking the snapshot of the database 34, the snapshot orchestrator 30 informs each snapshot sidecar container 24 to allow activity on the corresponding shard 36 (block 5006).

Figure 8:
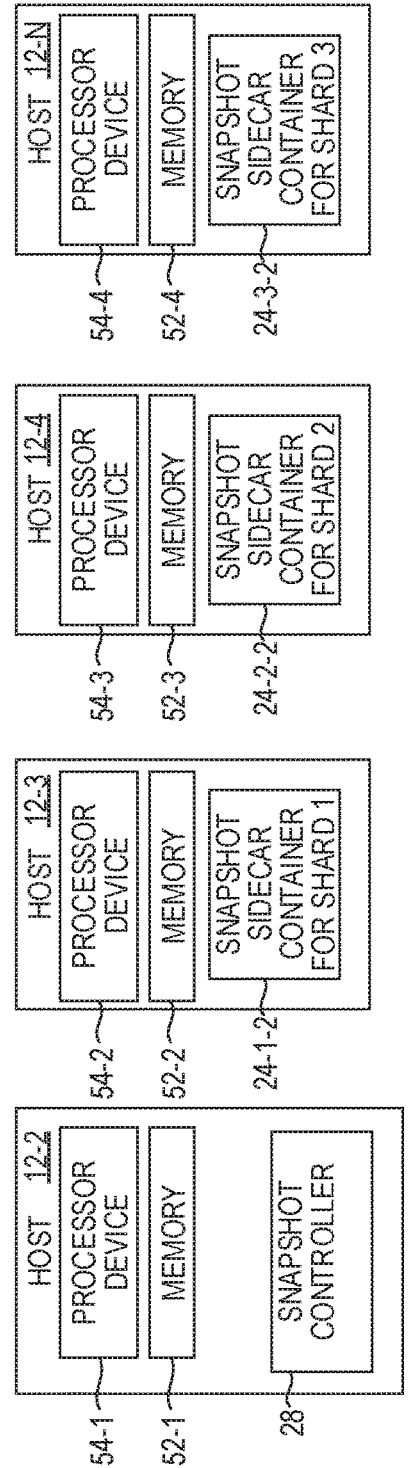
FIG. 8 is a simplified block diagram of the environment illustrated in FIG. 1.
Figure 8:
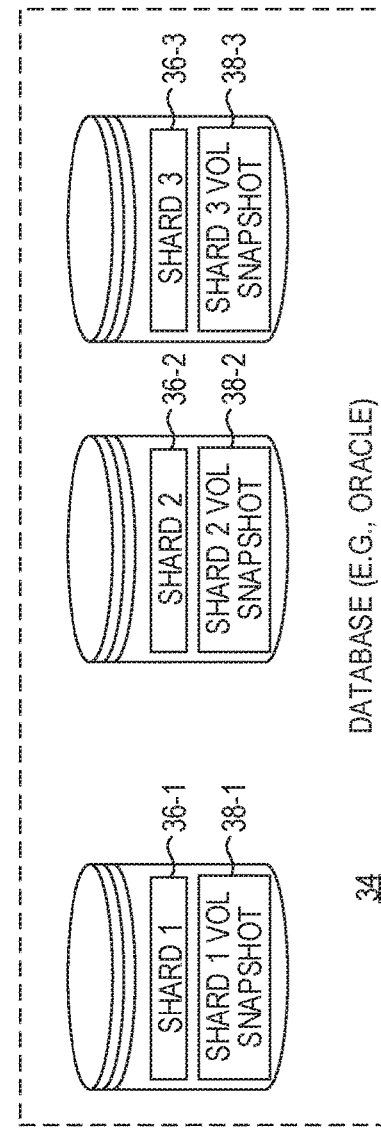

FIG. 8 is a simplified block diagram of the environment 10 illustrated in FIG. 1. FIG. 8 includes a system 50 that includes one or more memories 52-1-52-4, and one or more processor devices 54-1-54-4 coupled to the one or more memories 52-1-52-4. The one or more processor devices 54-1-54-4 are to determine that a snapshot of the database 34 having the plurality of shards 36 should be taken, each shard 36 having the corresponding snapshot sidecar container 24 of the plurality of snapshot sidecar containers 24. The one or more processor devices 54-1-54-4 are further to determine a consensus state among the plurality of snapshot sidecar containers 24 that the snapshot should be taken. The one or more processor devices 54-1-54-4 are further to direct the snapshot controller 28 to take the snapshot of the database 34, the snapshot generating a shard volume snapshot 38 for each shard 36 of the plurality of shards 36. The one or more processor devices 54-1-54-4 are further to, subsequent to the snapshot controller 28 taking the snapshot of the database 34, inform each snapshot sidecar container 24 to allow activity on the corresponding shard 36.

Figure 9:
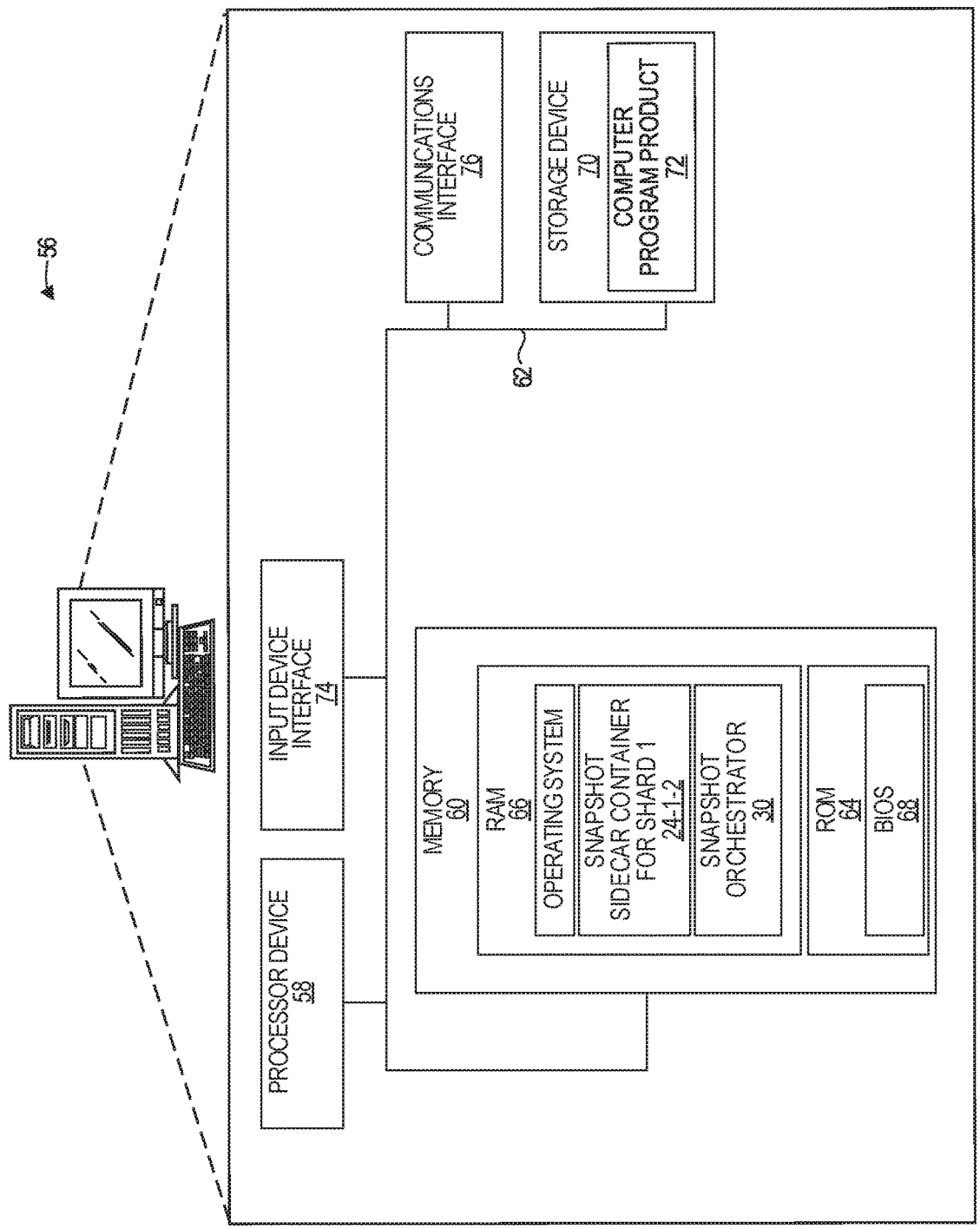
FIG. 9 is a block diagram of a computing device suitable for implementing examples according to one example.

FIG. 9 is a block diagram of a computing device 56 suitable for implementing any of the hosts 12 illustrated in FIG. 1, according to one example. The computing device 56 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 56 includes a processor device 58, a memory 60, and a system bus 62. The system bus 62 provides an interface for system components including, but not limited to, the system memory 60 and the processor device 58. The processor device 58 can be any commercially available or proprietary processor.

The system bus 62 may be any of several types of bus structures that may further interconnect to a memory bus (with or without a memory controller), a peripheral bus, and/or a local bus using any of a variety of commercially available bus architectures. The system memory 60 may include non-volatile memory 64 (e.g., read-only memory (ROM), erasable programmable read-only memory (EPROM), electrically erasable programmable read-only memory (EEPROM), etc.), and volatile memory 66 (e.g., random-access memory (RAM)). A basic input/output system (BIOS) 68 may be stored in the non-volatile memory 64 and can include the basic routines that help to transfer information between elements within the computing device 56. The volatile memory 66 may also include a high-speed RAM, such as static RAM, for caching data.

The computing device 56 may further include or be coupled to a non-transitory computer-readable storage medium such as a storage device 70, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 70 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 70 and in the volatile memory 66, including an operating system and one or more program modules, such as the snapshot sidecar container 24-1-2 and/or the snapshot orchestrator 30, which may implement the functionality described herein in whole or in part.

It should be noted that because the components discussed herein, such as the snapshot sidecar container 24-1-2, snapshot orchestrator 30, the snapshot controller 28, the container specification analyzer 26, and any other components, are components of respective computing devices, such as the computing device 56, functionality illustrated herein as being performed by such components may be attributed to the computing device on which such components execute. Similarly, where such components are implemented via complex programming instructions, functionality illustrated herein as being performed by such components may be attributed to the processor device of the respective computing device on which such components execute.

All or a portion of the examples may be implemented as a computer program product 72 stored on a transitory or non-transitory computer-usable or computer-readable storage medium, such as the storage device 70, which includes complex programming instructions, such as complex computer-readable program code, to cause the processor device 58 to carry out the steps described herein. Thus, the computer-readable program code can comprise software instructions for implementing the functionality of the examples described herein when executed on the processor device 58. The processor device 58, in conjunction with the snapshot sidecar container 24-1-2 and/or the snapshot orchestrator 30 in the volatile memory 66, may serve as a controller, or control system, for the computing device 56 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 58 through an input device interface 74 that is coupled to the system bus 62 but can be connected by other interfaces such as a parallel port, an Institute of Electrical and Electronic Engineers (IEEE) 1394 serial port, a Universal Serial Bus (USB) port, an IR interface, and the like. The computing device 56 may also include a communications interface 76 suitable for communicating with the network 42 as appropriate or desired.

Additional examples include a method that includes receiving, by a container specification analyzer executing on a computing device comprising a processor device, a container specification that identifies a database container to be initiated, the database container configured to provide database services to other containers, changing the container specification to generate an updated container specification that identifies a sidecar container, and returning the updated container specification for processing by a container initiator.

Another example includes the method discussed above, wherein receiving, by the container specification analyzer, the container specification further comprises receiving the container specification from a container orchestrator that is configured to schedule the container specification to be processed by the container initiator.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a computing device comprising a processor device, that a container specification comprises a keyword that corresponds to a command to initiate a database container, the database container configured to provide database services to other containers;
   in response to determining that the container specification includes the keyword that corresponds to the command to initiate the database container, modifying, by the computing device, the container specification to generate a new container specification that includes a command to initiate a first snapshot sidecar container, wherein the new container specification comprises a parameter that defines an attribute of a runtime environment of the first snapshot sidecar container;
   initiating the first snapshot sidecar container in association with the database container;
   determining that a first snapshot of a database having a plurality of shards should be taken, each shard having a corresponding snapshot sidecar container of a plurality of snapshot sidecar containers, wherein the first snapshot sidecar container comprises one of the plurality of snapshot sidecar containers;
   sending a snapshot request to each of the plurality of snapshot sidecar containers;
   receiving, from each of at least a portion of the plurality of snapshot sidecar containers, a snapshot request response based on whether a current resource utilization rate of the database container with which the snapshot sidecar container is associated is below a predetermined threshold;
   determining, based on the snapshot request response received from each of at least a portion of the plurality of snapshot sidecar containers, a consensus state among the plurality of snapshot sidecar containers that at least a majority of the snapshot sidecar containers indicate that the first snapshot should be taken;
   directing, based on the consensus state, each snapshot sidecar container to halt activity on a corresponding shard;
   directing a snapshot controller to take the first snapshot of the database, the first snapshot generating a shard volume snapshot for each shard of the plurality of shards; and
   subsequent to the snapshot controller taking the first snapshot of the database, informing each snapshot sidecar container to allow activity on a corresponding shard.

2. The method of claim 1 wherein determining that the first snapshot of the database should be taken comprises determining, by a snapshot orchestrator communicatively coupled to each snapshot sidecar container of the plurality of snapshot sidecar containers, that the first snapshot of the database should be taken.

3. The method of claim 1,
   wherein determining that the first snapshot of the database should be taken comprises determining, by a snapshot sidecar container of the plurality of snapshot sidecar containers, that the first snapshot of the database should be taken; and
   wherein receiving, from each of the at least a portion of the plurality of snapshot sidecar containers, the snapshot request response comprises receiving the snapshot request response based on whether the current resource utilization rate of the database container with which the snapshot sidecar container is associated is below a predetermined threshold, the current resource utilization rate including at least one of a current processor utilization rate or a current memory utilization rate.

4. The method of claim 1 further comprising:
   receiving, by a snapshot sidecar container of the plurality of snapshot sidecar containers, a request that the first snapshot of the database be taken;
   determining, based on the current resource utilization rate of the database container with which the snapshot sidecar container is associated, the snapshot request response; and
   providing the snapshot request response to a snapshot orchestrator.

5. The method of claim 4 further comprising:

wherein receiving, from each of the plurality of snapshot sidecar containers, the snapshot request response based on the current resource utilization rate of the database container with which the snapshot sidecar container is associated further comprises:
receiving, by the snapshot orchestrator, the snapshot request response from each of the plurality of snapshot sidecar containers; and
further comprising:
determining the consensus state by determining that a threshold number of snapshot request responses indicate that the first snapshot can be taken.

6. The method of claim 1 further comprising:
directing, by a snapshot orchestrator, each snapshot sidecar container to halt activity on the corresponding shard.

7. The method of claim 6 further comprising:
receiving, by the snapshot orchestrator, from each snapshot sidecar container, a notification that the activity has been halted on the corresponding shard prior to directing the snapshot controller to take the first snapshot of the database.

8. The method of claim 7 wherein directing the snapshot controller to take the first snapshot of the database is in response to receiving, by the snapshot orchestrator, from each snapshot sidecar container, the notification that the activity has been halted on the corresponding shard.

9. The method of claim 1 wherein directing the snapshot controller to take the first snapshot of the database further comprises directing, by a snapshot orchestrator, the snapshot controller to take the first snapshot of the database.

10. The method of claim 1 wherein directing the snapshot controller to take the first snapshot of the database further comprises directing, by each snapshot sidecar container of the plurality of snapshot sidecar containers, the snapshot controller to take a shard volume snapshot of the corresponding shard of the snapshot sidecar container.

11. The method of claim 1, further comprising:
receiving, by a sidecar snapshot container, a notification to halt activity on a database shard that corresponds to the sidecar snapshot container; and
sending a command to a volume on which the database shard exists to stop the activity.

12. The method of claim 1, further comprising:
receiving, by a sidecar snapshot container, a notification to halt activity on the corresponding shard of the sidecar snapshot container; and
sending a command to a database container to halt the activity on the shard.

13. The method of claim 1 further comprising:
determining that a second snapshot of the database having the plurality of shards should be taken;
requesting, from each of the plurality of snapshot sidecar containers, a snapshot request response;
receiving, from at least some of the plurality of snapshot sidecar containers, the snapshot request response;
determining, based on the snapshot request responses received from the at least some of the plurality of snapshot sidecar containers that a consensus state does not exist; and
notifying the plurality of snapshot sidecar containers that the second snapshot will not be initiated.

14. The method of claim 1 further comprising:
determining that a second snapshot of the database having the plurality of shards should be taken;
requesting, from each of the plurality of snapshot sidecar containers, a snapshot request response;
receiving, from at least some of the plurality of snapshot sidecar containers, the snapshot request response;
determining, based on the snapshot request responses received from the at least some of the plurality of snapshot sidecar containers that a consensus state exists;
notifying each snapshot sidecar container to halt activity on a shard that corresponds to the respective snapshot sidecar container;
determining that the activity cannot be halted on at least one shard of the plurality of shards; and
notifying the plurality of snapshot sidecar containers that the second snapshot will not be initiated.

15. The method of claim 14 wherein determining that the activity cannot be halted on the at least one shard of the plurality of shards comprises receiving a notification from a snapshot sidecar container that the activity cannot be halted.

16. The method of claim 14 wherein determining that the activity cannot be halted on the at least one shard of the plurality of shards comprises:
setting a timer;
maintaining track of acknowledgements received from the plurality of snapshot sidecar containers before the timer has expired;
determining that the timer has expired; and
determining that an acknowledgement has not been received from at least one of the plurality of snapshot sidecar containers.

17. A system comprising:
one or more memories;
one or more processor devices coupled to the one or more memories to:
determine that a container specification comprises a keyword that corresponds to a command to initiate a database container, the database container configured to provide database services to other containers;
in response to determining that the container specification includes the keyword that corresponds to the command to initiate the database container, modify the container specification to generate a new container specification that includes a command to initiate a first snapshot sidecar container, wherein the new container specification comprises a parameter that defines an attribute of a runtime environment of the first snapshot sidecar container;
initiate the first snapshot sidecar container in association with the database container;
determine that a first snapshot of a database having a plurality of shards should be taken, each shard having a corresponding snapshot sidecar container of a plurality of snapshot sidecar containers, wherein the first snapshot sidecar container comprises one of the plurality of snapshot sidecar containers;
send a snapshot request to each of the plurality of snapshot sidecar containers;
receive, from each of at least a portion of the plurality of snapshot sidecar containers, a snapshot request response based on whether a current resource utilization rate of the database container with which the snapshot sidecar container is associated is below a predetermined threshold;
determine, based on the snapshot request response received from each of at least a portion of the plurality of snapshot sidecar containers, a consensus state among the plurality of snapshot sidecar containers that at least a majority of the snapshot sidecar containers indicate that the first snapshot should be taken;

direct, based on the consensus state, each snapshot sidecar container to halt activity on a corresponding shard;

direct a snapshot controller to take the first snapshot of the database, the first snapshot generating a shard volume snapshot for each shard of the plurality of shards; and subsequent to the snapshot controller taking the first snapshot of the database, inform each snapshot sidecar container to allow activity on the corresponding shard.

18. The system of claim 17 wherein the one or more processor devices are further to:

receive, by a snapshot sidecar container of the plurality of snapshot sidecar containers, a request that the first snapshot of the database be taken;

determine, based on the current resource utilization rate of the database container with which the snapshot sidecar container is associated, the snapshot request response; and provide the snapshot request response to a snapshot orchestrator.

19. A computer program product stored on a non-transitory computer-readable storage medium and including instructions configured to cause one or more processor devices to:

determine that a container specification comprises a keyword that corresponds to a command to initiate a database container, the database container configured to provide database services to other containers;

in response to determining that the container specification includes the keyword that corresponds to the command to initiate the database container, modify the container specification to generate a new container specification that includes a command to initiate a first snapshot sidecar container, wherein the new container specification comprises a parameter that defines an attribute of a runtime environment of the first snapshot sidecar container;

initiate the first snapshot sidecar container in association with the database container;

determine that a first snapshot of a database having a plurality of shards should be taken, each shard having a corresponding snapshot sidecar container of a plurality of snapshot sidecar containers, wherein the first snapshot sidecar container comprises one of the plurality of snapshot sidecar containers;

send a snapshot request to each of the plurality of snapshot sidecar containers;

receive, from each of at least a portion of the plurality of snapshot sidecar containers, a snapshot request response based on whether a current resource utilization rate of the database container with which the snapshot sidecar container is associated is below a predetermined threshold;

determine, based on the snapshot request response received from each of at least a portion of the plurality of snapshot sidecar containers, a consensus state among the plurality of snapshot sidecar containers that at least a majority of the snapshot sidecar containers indicate that the first snapshot should be taken;

direct, based on the consensus state, each snapshot sidecar container to halt activity on a corresponding shard;

direct a snapshot controller to take the first snapshot of the database, the first snapshot generating a shard volume snapshot for each shard of the plurality of shards; and subsequent to the snapshot controller taking the first snapshot of the database, inform each snapshot sidecar container to allow activity on the corresponding shard.

20. The computer program product of claim 19 wherein the instructions further cause the one or more processor devices to:

receive, by a snapshot sidecar container of the plurality of snapshot sidecar containers, a request that the first snapshot of the database be taken;

determine, based on the current resource utilization rate of the database container with which the snapshot sidecar container is associated, the snapshot request response; and provide the snapshot request response to a snapshot orchestrator.

* * * * *